(12) United States Patent
Coscarella

(10) Patent No.: US 9,109,359 B1
(45) Date of Patent: Aug. 18, 2015

(54) WEATHER BARRIER FOR A BUILDING PENETRATION

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 14/194,331

(22) Filed: Feb. 28, 2014

(51) Int. Cl.
| | |
|---|---|
| *F16L 5/02* | (2006.01) |
| *F16L 5/10* | (2006.01) |
| *E04B 1/62* | (2006.01) |
| *E04B 1/68* | (2006.01) |

(52) U.S. Cl.
CPC . *E04B 1/625* (2013.01); *E04B 1/68* (2013.01); *F16L 5/02* (2013.01); *F16L 5/10* (2013.01)

(58) Field of Classification Search
CPC .............. F16L 5/02; F16L 5/10; E04D 13/14; E04D 13/143; E04D 13/1476; E04B 1/66; E04B 1/625; H02G 3/22; E02D 12/002
USPC .............. 52/219, 220.8, 741.4; 277/606, 607, 277/626, 630, 637, 644, 648; 285/43, 192, 285/204, 211
See application file for complete search history.

(56) References Cited

U.S. PATENT DOCUMENTS

| | | | | |
|---|---|---|---|---|
| 1,249,892 A | * | 12/1917 | Bropson ........................ | 285/43 |
| 2,985,465 A | * | 5/1961 | Church ......................... | 285/42 |
| 3,787,061 A | * | 1/1974 | Yoakum ........................ | 277/605 |
| 4,162,347 A | * | 7/1979 | Montgomery ................ | 252/70 |
| 4,265,058 A | * | 5/1981 | Logsdon ....................... | 52/58 |
| 4,350,351 A | | 9/1982 | Martin | |
| 4,482,161 A | | 11/1984 | Izzi, Sr. | |
| 4,526,407 A | * | 7/1985 | Kifer ............................. | 285/42 |
| 4,548,853 A | * | 10/1985 | Bryan ........................... | 428/131 |
| 4,563,847 A | * | 1/1986 | Hasty ............................ | 52/219 |
| 4,905,940 A | * | 3/1990 | Luka ............................. | 248/56 |
| 5,237,789 A | * | 8/1993 | Thaler .......................... | 52/219 |
| 5,248,154 A | | 9/1993 | Westhoff | |
| 5,501,472 A | | 3/1996 | Brancher | |
| 5,860,256 A | * | 1/1999 | Humber ........................ | 52/219 |
| 5,944,361 A | | 8/1999 | Bravo | |
| 6,185,885 B1 | * | 2/2001 | Thaler .......................... | 52/219 |
| 6,395,984 B1 | | 5/2002 | Gilleran | |
| 6,543,186 B2 | * | 4/2003 | Gilleran ........................ | 52/35 |
| 6,596,938 B2 | | 7/2003 | Gilleran | |
| 6,649,835 B2 | | 11/2003 | Gilleran | |
| 6,860,070 B2 | | 3/2005 | Gilleran | |
| 7,568,314 B2 | * | 8/2009 | Collins ......................... | 52/60 |
| 8,156,700 B2 | * | 4/2012 | Umlor .......................... | 52/220.8 |
| 2003/0019163 A1 | | 1/2003 | Dittel | |
| 2007/0245894 A1 | * | 10/2007 | Poulis ........................... | 96/4 |
| 2008/0124506 A1 | * | 5/2008 | Boge et al. ................... | 428/36.6 |
| 2009/0152820 A1 | | 6/2009 | Meyers | |
| 2013/0234404 A1 | * | 9/2013 | Coscarella .................... | 277/606 |
| 2014/0021688 A1 | * | 1/2014 | Hattori et al. ................ | 277/606 |

FOREIGN PATENT DOCUMENTS

| | | |
|---|---|---|
| EP | 0 161 557 A2 * | 11/1985 |
| EP | 2 063 163 A1 * | 5/2009 |

* cited by examiner

*Primary Examiner* — Robert Canfield
(74) *Attorney, Agent, or Firm* — Christensen O'Connor Johnson Kindness PLLC

(57) ABSTRACT

A weather barrier for a building penetration. The building penetration has an opening in a wall of the building and a utility in the opening. The weather barrier has a sheet of material that is flexible and water resistant and having an outer perimeter and a resilient seal attached to the sheet of material within the outer perimeter. The sheet of material extends out around the resilient seal. The resilient seal is sized to resiliently clamp about the utility such that the resilient seal seals against and is supported by the utility when installed.

12 Claims, 5 Drawing Sheets

WEATHER BARRIER FOR A BUILDING PENETRATION

TECHNICAL FIELD

This relates to a seal for a building penetration that helps maintain the integrity of the building envelope.

BACKGROUND

New construction, such as residential homes, often requires a building envelope made from a weatherproofing material, such as Tyvek™, which is a water resistant, breathable, flexible material that is placed on the outer walls of the building.

SUMMARY

There is provided a weather barrier for a building penetration, the penetration comprising an opening in a wall of the building and a utility in the opening. The weather barrier comprises a sheet of material that is flexible and water resistant and having an outer perimeter and a resilient seal attached to the sheet of material within the outer perimeter. The sheet of material extends out around the resilient seal. The resilient seal is sized to resiliently clamp about the utility such that the resilient seal seals against and is supported by the utility when installed.

In another aspect, the sheet of material may form a pocket within the resilient seal or the resilient seal may define an inner perimeter of an opening of the sheet of material.

In another aspect, the resilient seal may be molded, adhered or sewn to the sheet of material.

In another aspect, the resilient seal may comprise a first seal portion that extends toward a center of the resilient seal and has a first seal surface that engages the utility when installed. The first seal portion may be angled out of a plane of the resilient seal. The resilient seal may comprise a second seal portion that extends toward a center of the resilient seal and that has a second seal surface spaced from the first seal surface such that the first and second seal portions form a double seal on the utility when installed.

In another aspect, the sheet of material may be wrapped around and enclose the resilient seal.

In another aspect, the weather barrier may comprise a composite seal, the resilient seal being a part of the composite seal. The composite seal may comprise a rigid ring that supports the resilient seal. The composite seal may comprise a mating portion that engages the resilient seal, the sheet of material being retained between the resilient seal and the mating portion. The composite seal is sized to fit between an inner edge of the opening and an outer edge of the utility in the opening.

According to an aspect, there is provided a method of protecting a building penetration against weather, the penetration comprising an opening in a wall of the building and a utility in the opening, the method comprising the steps of providing a weather barrier as described above, and stretching the resilient seal and placing the resilient seal around the utility such that the resilient seal seals against and is supported by the utility.

Other aspects will be apparent from the description and drawings. The various aspects may be combined or substituted in any reasonable combination.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figures 1, 2:
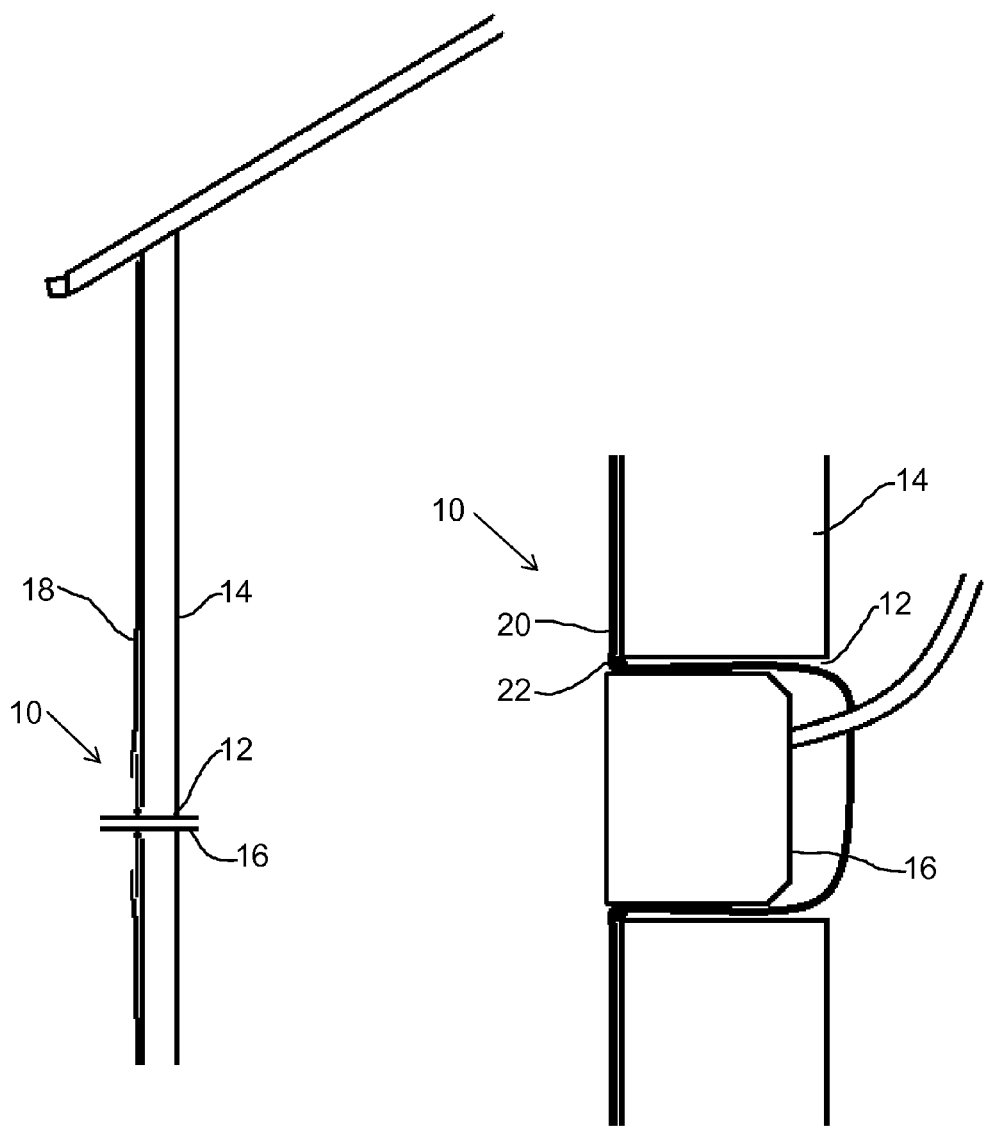
FIG. 1 is a side elevation view in section of a building with a weather barrier.
FIG. 2 is a detailed side elevation view in section of a building penetration.

A weather barrier for a building penetration, generally identified by reference numeral 10, will now be described with reference to FIGS. 1-11.

Referring to FIGS. 1 and 2, weather barrier 10 is designed to be used with building penetrations that have an opening 12 in a building 14, which will generally be in the wall, and a utility 16 positioned in opening 12. Utility 16 may take various forms, and is intended to include any supply line, tubing, utility box, or other component that is intended to connect services. As utility 16 may have various cross-sectional shapes, such as round, rectangular, octagonal, etc., it will be understood that weather barrier will be shaped accordingly.

Figure 3:
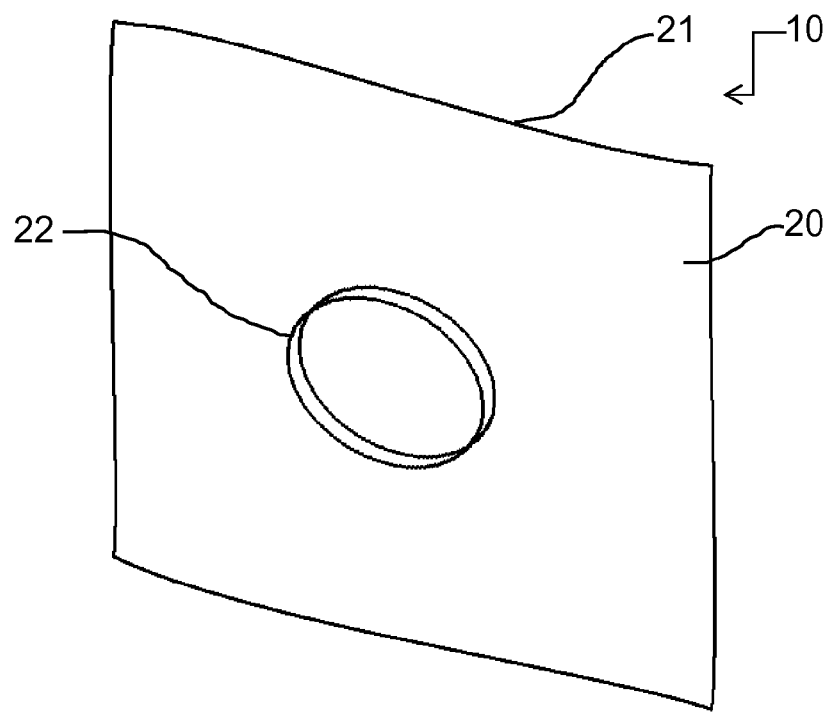
FIG. 3 is a perspective view of a weather barrier.

Referring to FIG. 3, weather barrier 10 has a sheet of material 20 that is flexible, water resistant and non-resilient. Sheet of material 20 is preferably made from a building wrap material, such as Tyvek™ that is breathable as well as water resistant, tar paper, or the like. This type of material is generally non-resilient and cannot be stretched to any appreciable degree or without damage.

A resilient seal 22 is attached to sheet of material 20 within its outer perimeter 21 such that sheet of material 20 extends out around resilient seal 22. Referring to FIG. 2, resilient seal 22 is sized to resiliently clamp about utility 16 such that resilient seal 22 seals against and is supported by utility 16 when installed. When installed, sheet of material 20 extends out around utility 16 and is large enough to cover opening 12. Sheet of material 20 can then be overlapped with the building wrap 18 on the rest of building 14 as part of the building envelope, as shown in FIG. 1.

Depending on the type of penetration, sheet of material 20 may form a pocket within the inner perimeter of resilient seal 22, such as to surround an electrical box as shown in FIG. 2, or an opening, such as to surround a pipe or other tubular body as shown in FIG. 1.

Figure 5:
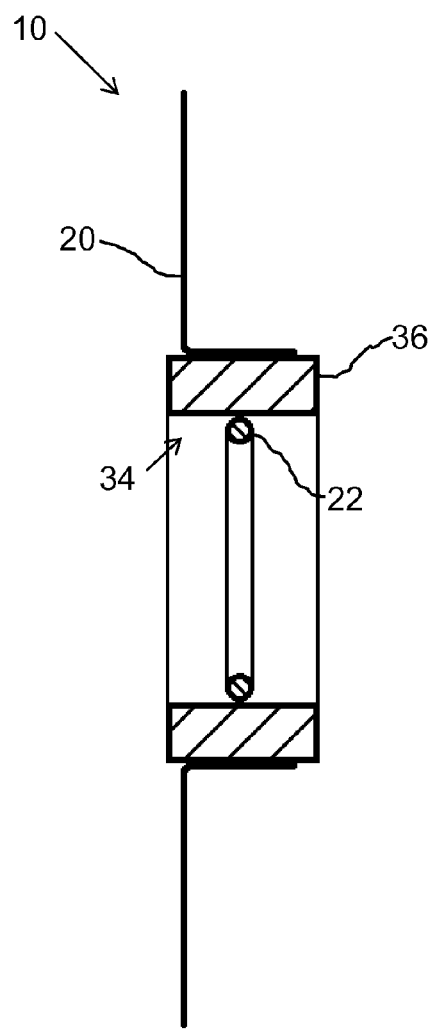
Figure 6:
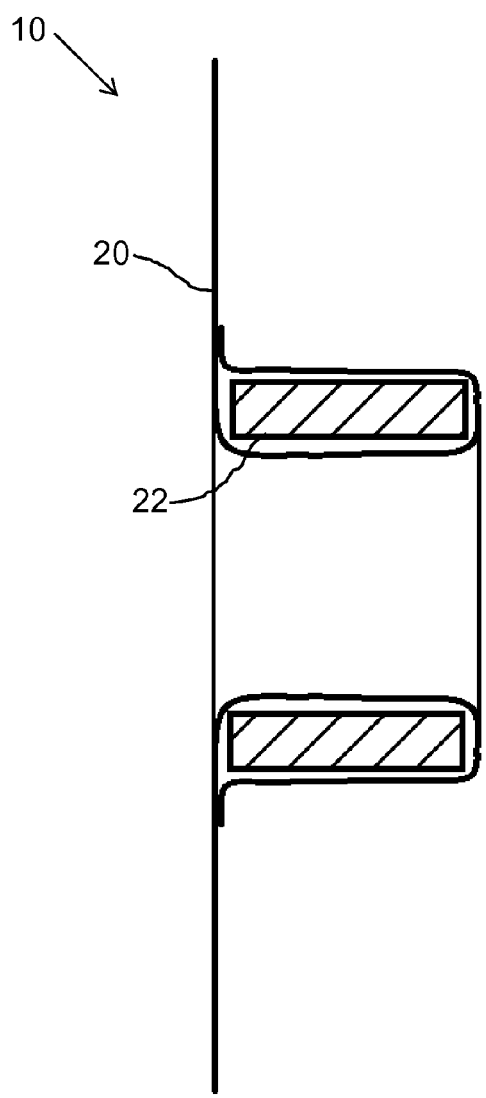
Figure 9:
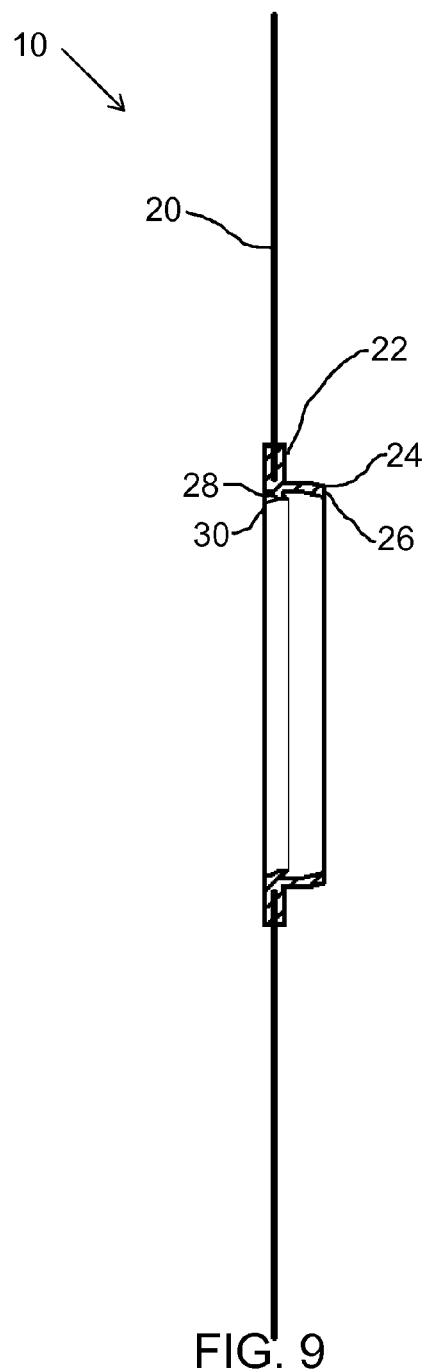
FIGS. 9-11 are side elevation views in section of alternative resilient seals.
Figure 10:
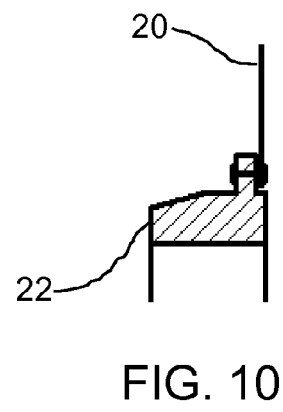

Resilient seal 22 may be attached to sheet of material 20 in various ways. For example, referring to FIG. 9, resilient seal 22 may be molded, such as by injection or compression molding, onto sheet of material 20. Sheet of material 20 may also be adhered to resilient seal 22 as shown in FIG. 5, sewn as shown in FIG. 6 or pin connected or riveted, as shown in FIG. 9. Other methods will also be apparent. When an adhesive or sewing is used, it may be desirable to wrap material 20 around resilient seal 22 as shown in FIG. 6. As sheet of material 20 does not stretch, some excess material may be required to allow resilient seal 22 room to stretch, depending on the design.

Figure 4:
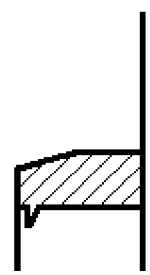
FIGS. 4-6 are side elevation views in section of weather barrier variations.

Referring to FIG. 4, in order to seal against utility 16, resilient seal 22 may have a first seal portion 24 that extends toward the center of resilient seal 22. First seal portion 24 has a first seal surface 26 that engages utility 16 when installed. As shown, first seal portion 24 is in the form of a sealing lip, and extends in from a larger body of resilient seal 22. Referring to FIG. 9, first seal portion 24 is angled out of the plane of resilient seal 22. When installed, this may extend inward into opening 12. As shown, resilient seal 22 also has a second seal portion 28 with a second seal surface 30 that extends toward a center of the resilient seal. Second seal surface 30 is spaced from first seal surface 26 such that first and second seal portions 26 and 30 are separated and form a double seal against utility 16 when installed. By doing so, the possibility of liquid entering through opening 12 is significantly reduced.

Figure 7:
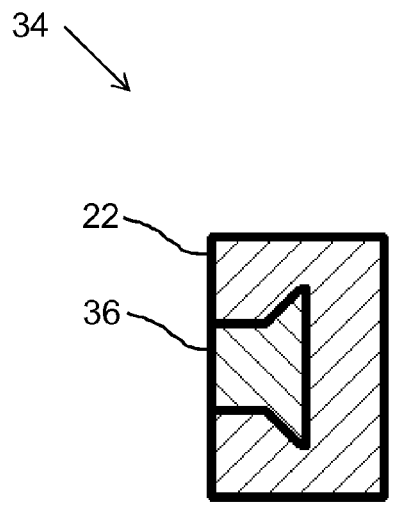
FIGS. 7 and 8 are side elevation views in section of resilient seals.
Figure 8:
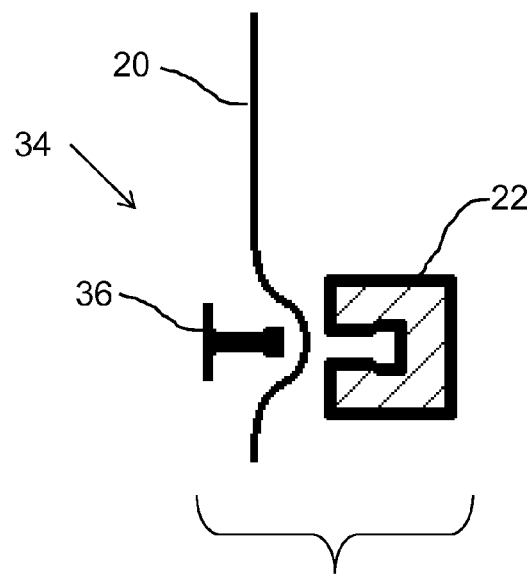
Figure 11:
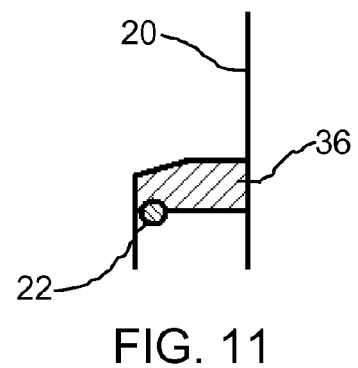

Referring to FIGS. 7 and 8, in some circumstances, resilient seal 22 may be part of a composite seal 34, or in other words, a multi-component seal. Composite seal 34 may include a second part 36 as shown. Second part 36 may be rigid or merely a different material, such as to provide more structural support or other desired properties to composite seal 34. Resilient seal 22 and second part 36 may be molded together, as shown in FIG. 7 or 11, or may be separably connected in a mating arrangement, as shown in FIG. 8, or may be carried by friction, as shown in FIG. 5. If separably connected as in FIG. 8, resilient seal 22 and second part 36 may be used to retain sheet of material 20 between resilient seal 22 and second part 36. This allows sheet of material 20 to be customized immediately prior to use or installation, if desired.

Referring to FIG. 1, resilient seal 22, or composite seal 34 as the case may be, may be sized to fit between an inner edge of opening 12 and an outer edge of utility 16 in opening 12, such that it is not disruptive to the installation of other components on building 14.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A weather barrier for a building penetration, the penetration comprising an opening in a wall of the building and a utility in the opening, the weather barrier comprising:
    a sheet of material made from a breathable, non-resilient, flexible and water resistant building wrap material, the sheet of material having an outer perimeter;
    a resilient seal attached to the sheet of material within the outer perimeter such that the sheet of material extends out around the resilient seal, the resilient seal being sized to resiliently clamp about the utility such that the resilient seal seals against and is supported by the utility when installed, the resilient seal being made from a different material than the sheet of material.

2. The weather barrier of claim 1, wherein the sheet of material forms a pocket within the resilient seal.

3. The weather barrier of claim 1, wherein the resilient seal defines an inner perimeter of an opening of the sheet of material.

4. The weather barrier of claim 1, wherein the resilient seal is molded, adhered or sewn to the sheet of material.

5. The weather barrier of claim 1, wherein the resilient seal comprises a first seal portion that extends toward a center of the resilient seal and has a first seal surface that engages the utility when installed.

6. The weather barrier of claim 5, wherein the first seal portion is angled out of a plane of the resilient seal.

7. The weather barrier of claim 6, wherein the resilient seal comprises a second seal portion that extends toward a center of the resilient seal and that has a second seal surface spaced from the first seal surface such that the first and second seal portions form a double seal on the utility when installed.

8. The weather barrier of claim 1, wherein the sheet of material is wrapped around and encloses the resilient seal.

9. The weather barrier of claim 1, comprising a composite seal, the resilient seal being a part of the composite seal.

10. The weather barrier of claim 9, wherein the composite seal comprises a rigid ring that supports the resilient seal.

11. The weather barrier of claim 9, the composite seal comprising a mating portion that engages the resilient seal, the sheet of material being retained between the resilient seal and the mating portion.

12. The weather barrier of claim 9, wherein the composite seal is sized to fit between an inner edge of the opening and an outer edge of the utility in the opening.

* * * * *